US005684581A

United States Patent [19]

French et al.

[11] Patent Number: 5,684,581

[45] Date of Patent: Nov. 4, 1997

[54] TORCH FOR INDUCTIVELY COUPLED PLASMA SPECTROMETRY

[75] Inventors: John Barry French, Oakville; Raymond Jong, Willowdale; Bernard Etkin, North York, all of Canada

[73] Assignee: MDS Health Group Limited, Etobicoke, Canada

[21] Appl. No.: 570,059

[22] Filed: Dec. 11, 1995

[51] Int. Cl.$^6$ .................................................... G01N 21/73

[52] U.S. Cl. .................................................... 356/316

[58] Field of Search .......................................... 356/316

[56] References Cited

U.S. PATENT DOCUMENTS

| | | | |
|---|---|---|---|
| 3,467,471 | 9/1969 | Greenfield et al. | 356/316 X |
| 4,035,604 | 7/1977 | Meleka et al. . | |
| 4,551,609 | 11/1985 | Falk | 356/316 X |

FOREIGN PATENT DOCUMENTS

| | | |
|---|---|---|
| 0 103 809 | 3/1984 | European Pat. Off. . |
| 0 634 2697 | 12/1994 | Japan . |

OTHER PUBLICATIONS

C.D. Allemand and R.M. Barnes, A Study of Inductively Coupled Plasma Torch Configurations, *Applied Spectroscopy*, vol. 31, No. 5, 1977, pp. 434–443.

J.L. Genna, R.M. Barnes and C.D. Allemand, Modified Inductively Coupled Plasma Arrangement for Easy Ignition and Low Gas Consumption, *Analytical Chemistry*, vol. 49, No. 9, Aug. 1977, pp. 1450–1453.

R. Rezaaiyaan, G.M. Hieftje, H. Anderson, H. Kaiser and B. Meddings, Design and Construction of a Low–Flow, Low–Power Torch for Inductively Coupled Plasma Spectrometry, *Applied Spectroscopy*, vol. 36, No. 6, 1982, 627–631.

G. Angleys and J.M. Mermet, Theoretical Aspects and Design of a Low–Power, Low–Flow–Rate Torch in Inductively Coupled Plasma Atomic Emissions Spectroscopy, *Applied Spectroscopy*, vol. 38, No. 5, pp. 647–653.

A. Montaser, G.R. Huse, R.A. Wax, S.K. Chan, D.W. Golighty, J.S. Kane and A.F. Dorrzapf, Analytical Performance of a Low–Gas–Flow Torch Optimized for Inductively Coupled Plasma Atomic Emission Spectrometry, *Analytical Chemistry*, vol. 56, No. 2, Feb. 1984, pp. 283–288.

R. Rezaaiyaan and G. M. Hieftje, Analytical Characteristics of a Low–Flow, Low–Power Inductively Coupled Plasma, *Analytical Chemistry*, vol. 57, No. 2, Feb. 1985, pp. 412–415.

R.C. Ng, H. Kaiser and B. Meddings, Low Power Torches for Organic Solvents in Inductively Coupled Plasma Emission Spectrometry, *Spectrochimica Acta.*, vol. 40B, Nos. 1/2, pp. 63–72, 1985.

L.L. Burton and M.W. Blades, A Comparison of Excitation Conditions Between Conventional and Low–Flow, Low–Power Inductively Coupled Plasma Torches, *Applied Spectroscopy*, vol. 40, No. 2, 1986, pp. 265–270.

(List continued on next page.)

*Primary Examiner*—Vincent P. McGraw
*Attorney, Agent, or Firm*—Bereskin & Parr

[57] ABSTRACT

A torch for Inductively Coupled Plasma Spectrometry (ICPS) is formed from quartz and has inner and outer tubes defining an annular channel. The end of the inner tube is within an end portion of the outer tube, to define a chamber for a plasma ball. An inlet for a main gas flow opens tangentially into the annular channel. The annular channel is configured so as to maximize the swirl component of this flow. To this end, a connection to the inlet is provided with an annular toroidal shape, having a cross-section to or larger than the inlet. Further, the inlet is mounted relatively close to the end of the inner tube, so as to minimise decay of the swirl component as the gas flows along the annular channel, the length of the annular channel being sufficient to ensure that the flow leaving the annular channel is uniform and has a uniform swirl component. This arrangement enables a significantly reduced consumption of gas to generate a plasma ball, and can give improved performance, in terms of a higher detection rate in a spectrometer.

24 Claims, 5 Drawing Sheets

OTHER PUBLICATIONS

Leo De Galan, M.T.C. De Loos–Vollebregt, Low–Gas–Flow Torches for ICP Spectrometry, Inductively Coupled Plasmas, *Analytical Atomic Spectrometry*, 2nd Ed., Chapter 18, 1992.

"A Low–Power Oxygen Inductively Coupled Plasma for Spectrochemical Analysis–I. Computer Simulation" by Pengyuan Yang in *Spectrochimica Acta* vol. 44B, No. 11, pp. 1081–1091, 1989.

"Inductively Coupled Argon Plasma Atomic Emission Spectrometry With an Externally Cooled Torch" by Peter A. M. Ripson et al. in *Analytical Chemistry* vol. 56, No. 13, pp. 2329–2335, Nov. 1984.

"A Low Argon Flow Inductively Coupled Plasma Torch Utilizing a Flame–Atomic Absorption Spectrometry Nebulizer" by M. D. Lowe in *Applied Spectroscopy* vol. 35, No. 1, pp. 126–128, Jan.–Feb. 1981.

TORCH FOR INDUCTIVELY COUPLED PLASMA SPECTROMETRY

FIELD OF THE INVENTION

This invention relates to a torch for Inductively Coupled Plasma Spectrometry (ICPS), and more particularly is more concerned with a torch for ICPS, which requires a lower flow of gas and lower radio frequency (RF) power, as compared to conventional torches.

BACKGROUND OF THE INVENTION

Inductively coupled plasma spectrometry is a technique that is now widely used for analysis of various samples. It provides an effective way of generating ions for analysis in a variety of spectrometers. It is used in mass spectrometry, optical spectrometry and elsewhere.

While the use of inductively coupled plasma (ICP) is widely used, it has a number of limitations. Firstly, it requires a high power radio frequency input. This input typically has a frequency around 40 mHz, and requires a power in excess of 1 kW. For RF powers in excess of 1 kW, the circuitry required to generate the RF input is complex and expensive. It requires the use of such devices as tank coils. It is desirable to reduce this power, to permit the use of simple and more economic solid state circuits.

A further consideration is that ICP requires the use of an argon gas to entrain the sample flow and support the plasma. Typically, argon gas flows are in excess of 15 l/min. As a consequence, when mass spectrometry machines and the like are used regularly, this can result in a significant operational cost. In many parts of the world, the cost of obtaining argon can be of the order of U.S. $7,500–12,000 per year.

Because of this, many workers in this field have explored the characteristics of the torches used to generate the plasma and looked for ways to reduce both the power demands and the gas flow requirements. Various approaches have been used.

An earlier proposal by Genna et al (Modified Inductively Coupled Plasma Arrangement For Easy Ignition and Low Gas Consumption by Genna, Barnes and Allemand; Analytical Chemistry, Vol. 49, No. 9, August, 1977) discussed the effect of swirl angle on the operation of a torch for ICP. However, the torch configuration was quite different from many current torches. It included an inlet for the primary or main gas flow opening directly into an annular space or channel between the outer and intermediate tubes, without the provision of any toroid, bulge or expansion to assist in the introduction of this flow. Further, the intermediate tube included a flared end portion, of greater diameter than the main part of this tube, resulting in narrowing of the annular gap between the outer tube and the intermediate tube.

The modification proposed in the Genna paper provided the gas inlet, for the main flow, with a narrow throat or nozzle where it opens into the annular channel. No details of the change in the inlet dimension are given. The argument is that, for the same flow rate, a narrow throat increases the velocity and hence the momentum of the gas introduced into the annular channel. Since this gas is introduced tangentially, this increases the swirl component of the velocity. It was reported that, for an axial velocity of 10 m/sec., which remained essentially unchanged between the original and modified torches, swirl velocity could be increased from 3.5 m/sec. to 38 m/sec. These axial and circumferential velocities are very high, compared to most conventional torches, in which typical velocities are axial approx. 2–7 m/sec and swirl less than 1 m/sec.

If these velocities were obtained at the outlet from the annular channel, then an even higher swirl velocity must be present at the inlet to this annular channel, since the swirl velocity will be dissipated by drag along the annular channel. Providing such extreme velocities is, in general terms, not compatible with generating a uniform, smooth flow. A narrow throat may generate a narrow high velocity jet, but it will also generate considerable turbulence.

Another paper, Design and Construction of a Low-Flow, Low-Power Torch for Inductively Coupled Plasma Spectrometry by R. Rezaaiyaan et al. (Applied Spectroscopy, Vol 36, Nov. 6, 1982) makes reference to the earlier paper by Genna et al. Of interest, it attempted the same technique of constricting the inlet tube, to increase the inner velocity, with the intention of increasing the swirl velocity. Here, the inner tube diameter was constricted from a relatively large diameter (4 mm) to a relatively small diameter (1 mm). While it was found that this affected the RF power and coolant flow required to ignite the plasma, no significant effect was found on the coolant flow rate required to sustain a stable plasma, for a given applied power. It can also be noted that this paper did not even measure or consider the effect of the spacing between the inlet for the main gas flow and the end of the intermediate tube, defining the end of the annular channel.

Another approach is a so-called MAK torch, developed by Sherritt Gorden Mines Ltd. The basic approach taken in the MAK torch is to reduce the annular space between the intermediate and outer tubes, available for the primary or main gas flow so that the gas flow can be reduced. In many conventional or standard torches, this annular gap has a radial dimension of 0.9 mm, although, a dimension of 1 to 2 mm has also been reported. In the MAK torch it is reduced to 0.3 mm. Again, the theory is that the narrower gap will accelerate the flow, so a lower flow rate could be used. While this can give some reduction in gas flow, it is not wholly satisfactory. The narrower gap must necessarily accelerate the flow axially, but not circumferentially, with the consequence that it reduces the swirl angle. Producing a torch with such a narrow annular gap is difficult and costly; it is difficult to maintain the tubes sufficiently concentric with one another. The power requirements are also higher. There are also other problems in obtaining the low flow rates alleged for the MAK torch, and there are reports in the literature teaching operation at conventional flow rates.

An alternative approach, developed by Applied Research Laboratories, is to reduce all dimensions of the torch to produce a so-called miniaturized torch. Such a smaller torch, as will be expected, generates a smaller plasma ball. This has numerous disadvantages. The smaller size requires the coil to be reconfigured. In general, it cannot provide a high enough temperature for organic samples. The plasma ball is closer to the wall, which can lead to difficulties in operation.

SUMMARY OF THE INVENTION

While there is some discussion in the art on the importance of swirl angle, the significance of both swirl angle and velocity have been poorly understood. More particularly, there is no discussion in the literature on the importance of the axial length of the annular gap through which the main gas flows, in affecting swirl angle and velocity. In general, the assumption has been that if the main gas is injected tangentially into this annular gap or channel, then a sufficient swirl component would be generated. More particularly, the present inventors have determined that certain characteristic features of the annular channel either need to be present or need to be optimized, in order to obtain a swirl component to the flow of main gas, which has the required characteristics of velocity, angle and uniformity.

In accordance with the present invention, there is provided a torch for inductively coupled plasma spectrometry, the torch comprising:

an outer tube having a first free end;

an inner tube mounted coaxially within the outer tube, and having a first free end located within the outer tube, a portion of the outer tube extending between the first ends of the inner and outer tubes and defining a chamber for a plasma ball;

an annular channel defined between the inner and outer tubes and opening into the chamber; and a first inlet for a main gas flow opening tangentially into the annular channel, so as to generate a swirl component in the main gas flow through the annular channel;

wherein the axial distance between the first inlet and the first end of the inner tube is reduced such as to give a swirl angle, where the annular channel opens into the chamber, sufficient to enable a reduced main gas flow to keep a plasma ball centred and the torch cool, said distance being sufficient to maintain the swirl component of the main gas flow substantially uniform.

Preferably, the swirl angle is at least 35°, for example in the range 35°–45°. To ensure good generation of a swirl component, the outer tube also includes a toroidal bulge, into which the first inlet opens, the toroidal bulge having an internal cross-section corresponding to the internal cross-section of the first inlet, the first inlet being tangential to the toroidal bulge. Even more preferably, the cross-section of the first inlet, through the first inlet and into the toroidal bulge, is substantially uniform, without any significant throttling of the flow to accelerate the flow.

Advantageously, at least for torches of conventional dimensions, the axial distance between the first inlet and the first end of the inner tube is in the range 24–26 mm.

Another aspect of the present invention provides a method of generating a plasma ball for inductively coupled plasma spectrometry, the method comprising the following steps:

(1) providing a torch having an outer tube defining a generally cylindrical chamber for a plasma ball, an inner tube, an annular channel defined between the inner and outer tubes which annular channel opens into the chamber, and a first inlet for a main gas flow opening tangentially into the annular channel, the axial length of the annular channel between the first inlet and a free end of the inner tube being reduced such as to give a swirl angle, where the annular channel opens into the chamber, sufficient to enable a reduced main gas flow to keep a plasma ball centred and the torch cool, said distance being sufficient to maintain the swirl component of the main gas flow substantially uniform;

(2) providing a tube for a nebulizer gas flow, generally coaxial with the inner and outer tubes, so as to define a secondary annular channel between the nebulizer tube and the inner tube, the nebulizer tube opening into the chamber;

(3) providing a flow of nebulizer gas including a sample through the nebulizer tube to the chamber, and an auxiliary gas flow through the secondary annular channel to the chamber;

(4) providing a main gas flow through the first inlet to the annular channel, the flow rate of the main gas being selected so as to provide sufficient swirl velocity to the main gas flow in the chamber, to maintain a stable plasma ball and protect the outer tube; and (5) igniting a plasma ball in the chamber, by means of an applied radio frequency field.

Preferably, the flow rate of the main gas flow is selected so as to give a swirl velocity, where the main gas flows from the annular channel into the chamber, in excess of 2 m/sec, more preferably in the range 2–5 m/sec.

For a torch with an annular channel having an outer diameter of approximately 18 mm and an inner diameter of approximately 16 mm, the main gas flow can be less than or equal to 10 l/min, preferably less than 8 l/min.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

Figure 6:
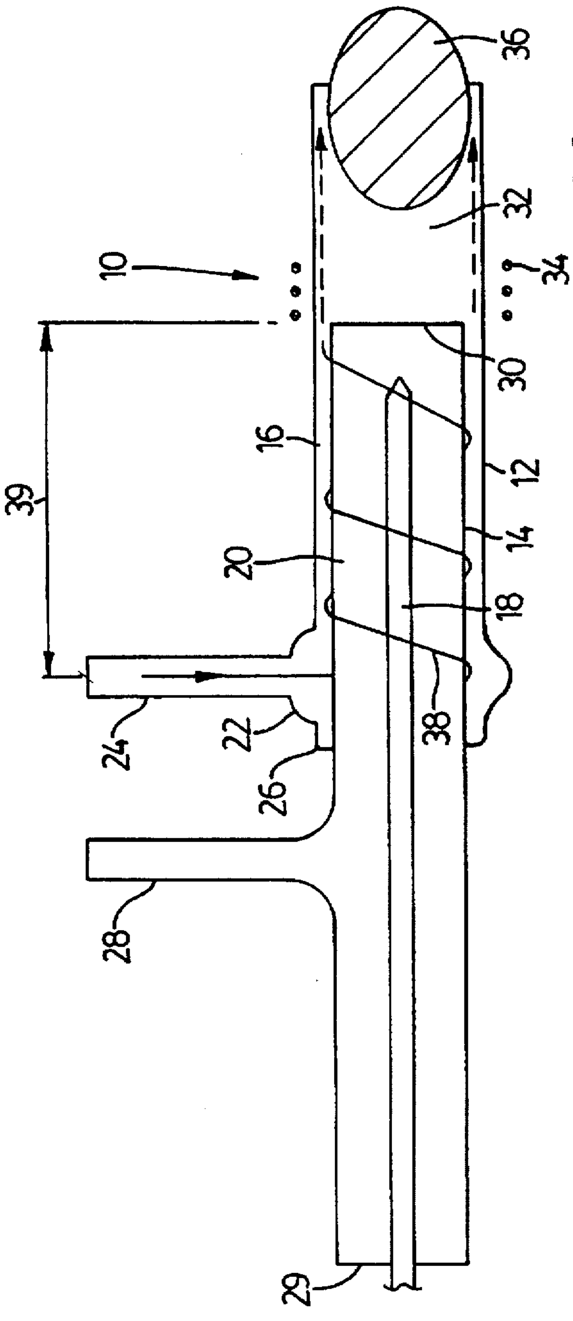
FIG. 6 (PRIOR ART)
FIG. 6 is a schematic view of a conventional torch.
Figure 7:
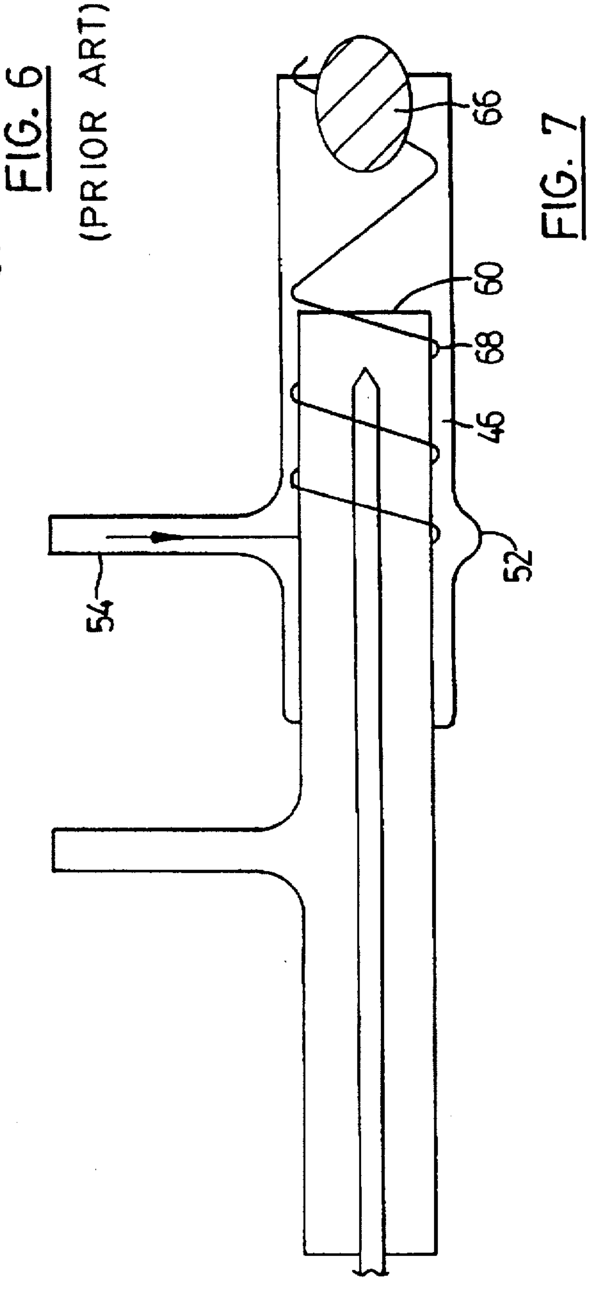
FIG. 7 is a schematic view of a torch in accordance with the present invention, as shown in FIGS. 1–4.

A typical, conventional argon ICP torch consists of an assembly of two concentric quartz tubes. Such a torch is shown in FIG. 6 and designated by the reference 10. This conventional torch 10 has an outer quartz tube 12 and an inner quartz tube 14. As shown, the tubes are mounted concentrically, to define an annular channel 16 through which a primary flow of gas passes. The inner or intermediate quartz tube 14 surrounds a small diameter quartz tube 18, through which a flow of nebulizer gas passes. Between the tube 18 and the intermediate or inner quartz tube 14, there is an inner or secondary annular channel 20, for an auxiliary gas flow.

The outer quartz tube 12 has an inlet 24, and as indicated at 26 it is closed at one end to the inner tube 14. The inlet 24 is connected to a toroidal bulge 22. Correspondingly, the inner or intermediate tube 14 has an inlet 28, and is closed at one end 29 where the tube 18 for the nebulizer flow enters. Consequently, flows of all three gases pass from left to right, as viewed in FIG. 5.

The inner tube 14 has a first or free end at 30. The outer tube 12 extends further to define a chamber 32 for confining a plasma. As indicated at 34, an RF coil 34 is provided around the outer tube 12, adjacent the end of 30 of the inner tube 14, for exciting the plasma.

A typical plasma ball or zone is indicated at 36, and this tends to be located within and downstream from the coil 34, towards the end of the outer tube 12.

Now, the primary purpose of the extended portion of the outer tube 12 is to prevent admixture of ambient air and to confine the plasma. Theoretically, it is possible to create and sustain an argon plasma with as little as 1 l/min of argon. However, even with a high temperature material like quartz, the heat from the plasma can cause severe damage leading to a number of undesirable effects, such as devitrification. To prevent this, the main flow of gas through the annular channel 16 is increased to the order of 15 to 16 l/min. This acts to confine the plasma and keep it and the heat generated within the plasma away from the quartz wall of the tube 12. As well a flow of argon gas is provided through the inner annular channel 20, to stabilize the plasma ball, and this is typically of the order of 1 l/min. This auxiliary flow also causes the plasma ball to stand off from the injector tip and prevent the tip from being overheated. The small diameter tube 18 provides a nebulizer flow again of the order of 1 l/min, in which a sample is entrained.

Thus, the main reason for the large primary flow through the channel 16 is to contain the plasma ball 36 within the tube 12, and to prevent damage to the quartz.

Now, FIG. 6 shows in schematic fashion, a streamline 38 indicating the flow of the primary gas. It is here noted that flow in FIG. 5 is counterclockwise around the channel 16, while the inlet arrangement in FIGS. 1–4 will give a clockwise flow; whether the flow is clockwise or counterclockwise is immaterial. As indicated, it follows a helical path. Now, as the annular channel 16 is closed at one end, the mean axial velocity along the channel 16, assuming incompressible flow which is reasonable for the present purposes, is essentially constant between the inlet and outlet of the annular channel 16. The inlet 24 is tangential, and generates a swirl component to the velocity, as indicated by the helical shape of the line 38. However, as the gas passes along the channel 16, there is nothing to maintain this swirl component of the velocity. The channel 16 includes no fins or ducts to maintain a certain helical flow pattern.

Conventional teaching has been that, if a significant swirl component was generated at the inlet 24, then this would be adequate. The present inventors have now discovered that in fact there is a significant decay of the swirl component. As indicated by the schematic profile of the line 38, the helix or swirl angle starts off relatively large and decays to a smaller value. When the gas enters the chamber 32, the swirl component has decayed away considerably. The swirl angle is approximately 15° and the swirl velocity is typically the order of 0.6 m/sec., and in any event below 2 m/sec.

The approach taken in the MAK torch design, and other designs, is to increase the velocity of the primary gas flow as it enters the chamber 32. However, this increases solely the axial component of the velocity; the actual value of the swirl component or the importance of the swirl component has not been recognized in these attempts to produce a low-flow torch.

This conventional torch has an outer tube 12 with an outside diameter of 20 mm and an internal diameter of 18 mm; the inner tube 14 has an outer diameter of 16 mm and an inner diameter of 14.00 mm (all dimensions here are approx.). This gives a radial dimension for the annular channel 16 of 1.00 mm. The nebulizer tube 18 has an outer diameter of 3.4 mm and an internal diameter of 1.4 mm, giving a radial dimension for the inner annular channel 20 of 5.3 mm approximately. The end of the nebulizer tube 18 is set back 3 mm from the end 30, and the chamber 32 has an axial extent of 24 mm.

Both the inlet tubes 24, 28 have a 6 mm external diameter and a 4 mm internal diameter.

More importantly, the spacing of the inlet tube 24 from the tube end 30, as indicated by the dimension 39 is 38 mm. Further, the external diameter of the toroidal bulge 22 is 24 mm. With a wall thickness of 1 mm, this gives an effective radial extent around the toroid of approx. 3 mm. The small dimensions of the bulge 22 required some throttling of the inlet 24 where it joins the bulge 22

Reference will now be made to FIGS. 1–5 which show a torch in accordance with the present invention. Here, an outer tube 42 and an inner tube 44 are provided as before, defining an annular channel 46. A smaller diameter tube 48 is again provided for the nebulizer flow, so as to define an inner or secondary annular channel 50.

The tube 42 has an inlet or spigot tube 54, and a toroidal bulge 52 is provided around the outer tube 42 where the inlet 54 joins it. The inner tube 14 has a respective inlet 58. The tubes 42, 44 are closed at 56 and 59, as for the conventional torch. A chamber 62 is defined for the plasma, and an RF coil 64 surrounds one end of the chamber 62. A typical plasma ball 66 is shown in FIG. 6.

Figure 3:
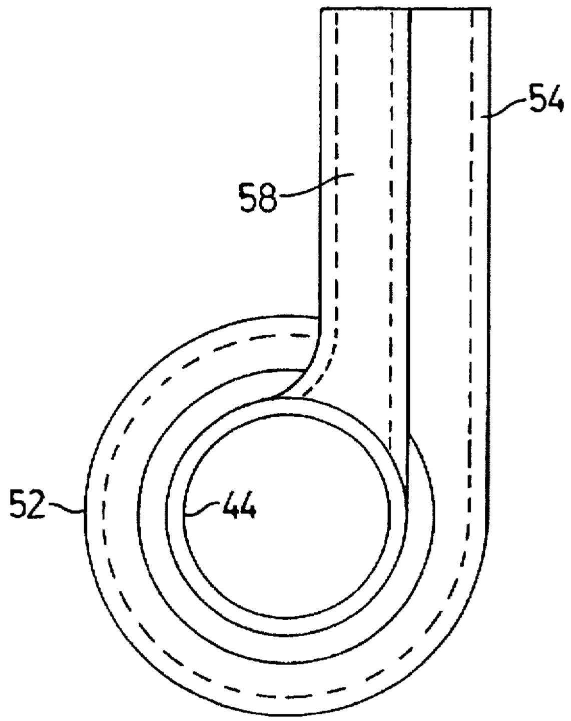
FIG. 3 is a view in the direction of arrows 3—3 of FIG. 2.
Figure 4:
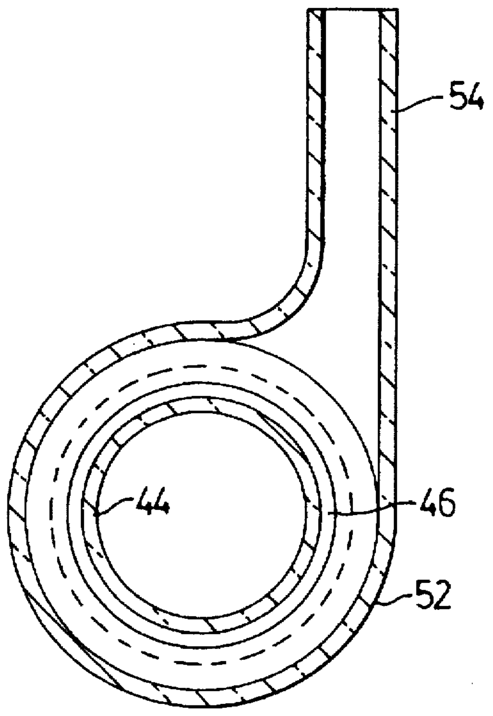
FIG. 4 is a cross-section along line 4—4 of FIG. 2.
Figure 5:
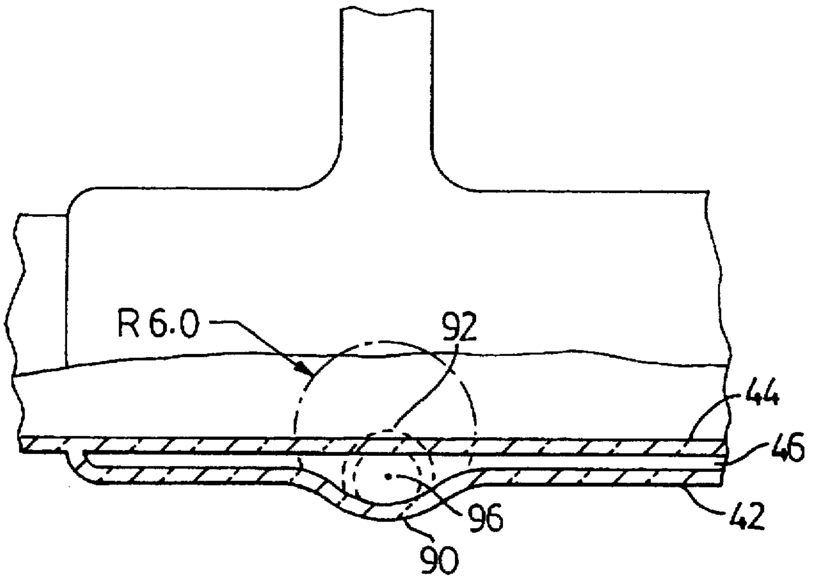
FIG. 5 shows a view along the axis of an inlet spigot shown in FIG. 4, on a larger scale.

Now, as shown most clearly in FIGS. 3 and 4, the inlets 54 and 58 are tangential to the respective annular channels 16 and 20, and have an external diameter of 6.00 mm and an internal diameter of 4.01 mm.

Concerning the dimensions of the torch 40, the outer tube 52 has an outer diameter of 20 mm and an internal diameter of 18.01+0/-0.05 mm; the inner tube 54 has an outer diameter of 16.00+0.05/- 0.00 mm and an internal diameter of 14.00 mm. This gives a maximum radial width for the channel 56 of approx. 1 mm.

Most importantly, as FIG. 4 shows, the toroid or bulge 52 has a radial extent corresponding to the internal diameter of the inlet 54. It has been discovered that this toroid or bulge must be provided with a cross-section corresponding to the internal cross section or diameter of the inlet 54, so as to provide a smooth transition of the flow from the inlet 54 into the annular channel 46, without throttling or accelerating the flow. Also, it has now been discovered that the toroid or bulge 52 must be accurately formed, and be aerodynamically smooth. If it is not of uniform section, or is eccentric or imperfect in any way, the flow is effectively caused to detach from the outer wall of the toroid 52. The flow is then accelerated axially down the channel 46, before any significant swirl flow component can be developed.

Figures 1, 2:
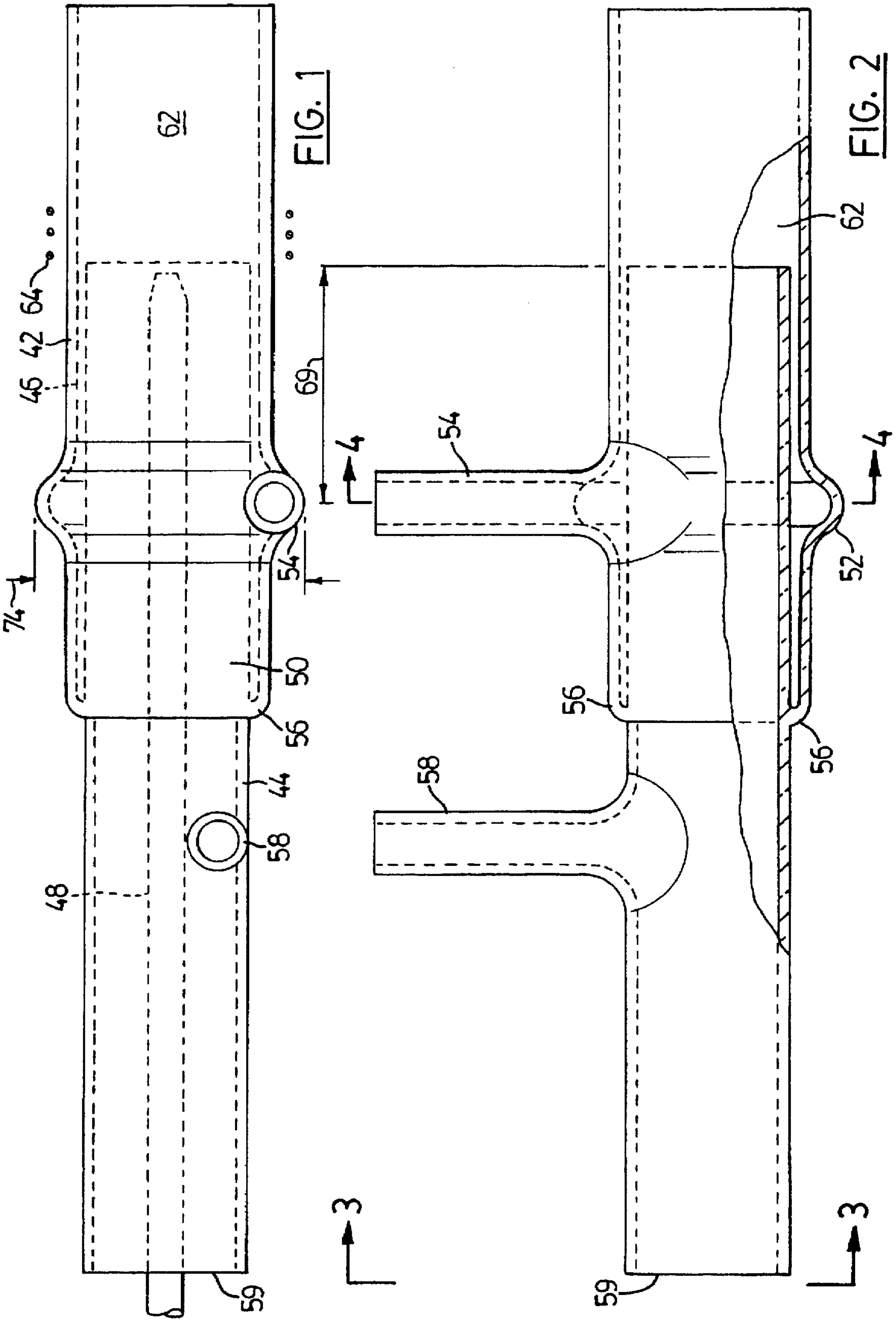
FIG. 1 is a view from one side of a torch in accordance with the present invention.
FIG. 2 is a view from another side, of the torch of FIG. 1, showing the torch partially cut away.

Corresponding to the inlet 54, the bulge 52, in section, has a circular portion 90, having a radius of 6.00 mm extending through an arc of 90°. This arc is centred, at a point 92 in FIG. 5, approx. 0.4 mm inside the inner wall of the tube 44, and axially equidistant from ends of the bulge 52. As shown in FIG. 1, this gives an overall outside diameter 94 to the bulge 52 of 25.2 mm with a tolerance of +0.5 mm/-0.00. The edges of the portion 90 flow smoothly into the outer tube 42, and the overall axial extent of the bulge 52 is 25–26 mm, or over 10 mm longer than on conventional torches. The spigot or inlet tube 54 is smoothly continuous with the circular portion 90. Thus, the tube 54 is centred, in the section of FIG. 5, at a point 96 that is between the inner and outer tubes 42, 44, this point being 1.6 mm from the outside of the inner tube 44 and 2.00 mm from the inside of the outer tube 42; again the point 96 is equidistant, axially, from ends of the bulge 52. Thus the radial extent of the bulge 52 is 3.6 mm, or 0.6 mm greater than a conventional torch. The tube 54 is shown in dotted outline in FIG. 5. Thus, the tube 54 has its axis tangential with the centre of a section of the toroidal bulge 52; also as shown in FIG. 4, the wall of the inlet 54 is tangential to the outside of the toroidal bulge 52, to prevent flow separation around the outside of the bulge 52. The cross-section of the toroid or bulge 52 is slightly greater than the internal section of the inlet 54, so that there is no abrupt reduction in cross-section, tending to accelerate the flow, and the transition from the inlet 54 is aerodynamically smooth.

Additionally, the bulge 52 tapers smoothly into the channel 46, i.e. there is an aerodynamically smooth transition, again to enhance the swirl component of the flow.

Again, the nebulizer tube had an external diameter of 3.4 mm and an internal diameter or 1.4 mm giving a radial extent or width for the secondary channel 20 of 5.3 mm. The outlet of the nebulizer tube was set back 3 mm from the tube end 60. The chamber 32 had an axial extent of 24 mm. Both the inlets 54 and 58 have internal diameters of 4.00 mm and external diameters of 6.00 mm.

Most importantly, in accordance with the present invention, the dimension 69 (the axial length of the annular channel 46), corresponding to the dimension 39 of the conventional torch, is now reduced from 38 mm to 24 mm. As shown in FIG. 6, this results in a flow pattern indicated by the streamline 68, which is quite different from the conventional torch. By placing the inlet 54 closer to the tube end 60, there is less axial length for the swirl velocity component to decay. Also, the provision of the toroid or bulge 52 assists in the development of a strong swirl component.

It has now been found that the swirl angle is typically in the range of 35°–45° for a primary flow of 10 l/min, this gives a swirl velocity of 3.1 m/sec; this reduces to 2.5 m/sec for a flow of 8 l/min. With the new torch, it has been found that it can be ignited with a primary flow in the range of 9–11 l/min. Once ignited, the flow can be reduced to a range of 7.65–8 l/min. The nebulizer flow is typically run in the range 0.84–0.94 l/min., and the secondary or stabilizer flow is of the order of 1 l/min.

When the gas of the plasma rotates about the axis of the torch with a significant swirl component, a centrifugal field is established. This results in an elevated gas pressure on the wall and a lower pressure on the axis. This radial pressure gradient assists in centering the plasma ball, here indicated at 66, more tightly on the axis of the tube. The effect is similar to a hot gas rising in a gravity field, i.e. the lighter gas move towards the area of lower pressure. The concentration of the plasma around the axis is believed to be beneficial in that it promotes a smooth stable plasma and assists in preventing hot gases from contacting the wall and damaging it. As FIG. 6 shows, the plasma ball tends to be smaller and generally tighter, as compared to a conventional torch. It has now been discovered from experiments and theoretical calculations that the strength of rotation, i.e. the swirl velocity is very important. Here, reference to "swirl velocity" denotes the initial swirl velocity when the gas exits the annular channel 46. For any given set of operating conditions, i.e. gas flow to the torch and RF power level, there is a minimum rotation below which the torch does not have acceptable performance. Moreover, the inventors have established that the swirl component needs to be higher at low torch flows, e.g. less than 10 l/min., than at higher ones.

Now, plasma rotation is generated almost exclusively by the swirl component of the primary gas flow; any swirl component of the secondary gas flow has a minimal effect, due to the much lower flow rate and due to the flow being closer to the axis. Thus, if has now been realized that the problem of producing an acceptable plasma at low torch flows, becomes a problem of ensuring that the circumferential or swirl component of the gas velocity is high enough where the gas is injected into the plasma chamber 62.

The inventors have established that a swirl velocity of below 2 m/sec, for torches of the type tested, is insufficient. Theoretical calculations show improvements up to 5 m/sec., but no benefit beyond that.

With the torch of the invention, a higher swirl velocity is produced at 10 l/min than a standard torch running at 16 l/min., without increasing axial velocity. This enables a torch to be run reliably at 10 l/min. or less, e.g. down to 7.65 l/min. with an auxiliary gas flow of 0.6 l/min. and a nebulizer flow around 0.9 l/min. This gives a total flow of 9.15 l/min. This gives an argon reduction of the order of 40%, as compared to conventional torch with a flow in the range of 15–16 l/min.

Reference can now be made to the other drawings which show experimental and theoretical results. A number of different tests have been carried out, to establish both the advantages of the new torch configuration, and also that as measured by various standard tests, it is equivalent to a conventional torch.

In a test with rhodium in the amount of 10 parts/billion (10 ppb), the primary gas flow was set at 8 l/min. This gave maximum Rh+counts/sec. (cps) for RF powers in the range 1,000–1,400 W. However, at 1,400 W and TOM (Top Of the Mountain or peak) conditions, the torch overheats with severe damage to the outer tube. This can be avoided by increasing the primary gas to 10 l/min, with a reduction in the Rh+cps, to a level equivalent or up to 20% higher than a standard torch operating at 1,000 W and at 13 l/min. for the primary gas flow.

The base line response for a standard torch with a 10 ppb Rh sample is 92,000 cps with 13 l/min. primary gas at a power level of 1,000 W. Tests with other standard torches had the following results, where "Neb" designates flow through the nebuliser tube 48. The reference to "ELAN 5000" and "ELAN 6000" are references to standard ICPS machines, for mass spectroscopy, made by the assignee of the present invention. These machines have different characteristics, which explain the different results from the two different machines. The percentage figures are an estimate of the Root Mean Square (RMS) deviation, in known manner. A "?" indicates no data was obtained.

TABLE A

| Primary(54) | Auxiliary(58) | Neb(48) | Rh | CeO % | Ba++ |
|---|---|---|---|---|---|
| | | ELAN 5000(1000 W) | | | |
| 13.0 | 0.8 | 0.86 | 70000 ~2% RSD | 2.2% | 1.2% |
| | | ELAN 6000 (1200 W) | | | |
| 15.0 | ? | 0.8 | 240000 ~2% RSD | <3% | ? |

Corresponding tests with these torches modified in accordance with the present invention gave the following results.

TABLE B

| Primary(54) | Auxiliary(58) | Neb(48) | Rh | CeO % | Ba++ |
|---|---|---|---|---|---|
| | | ELAN 5000(1000 W) | | | |
| 7.65 | 1.0 | 0.86 | 110000 ~2.8% RSD | 2.3% | 1.2% |
| | | ELAN 6000 (1000 W) | | | |
| 8.0 | 1.0 | 0.84 ~2% RSD | 30000 | <3% | ? |

What is striking from these results is that the primary gas flow is reduced significantly from 13 and 15 l/min. to 7.65 and 8 l/min. The secondary auxiliary flow was increased slightly, while the nebulizer flow is essentially the same. Acceptable values were obtained for the CeO and Ba++, both of which are undesirable and should be as low as possible. The levels are generally comparable between the conventional and modified torches. Interestingly, the level recorded for Rh is significantly higher on the modified instrument. Indeed, for the instrument identified as ELAN 5000, there is an almost 50% increase in the Rh count measurement.

Figure 8:
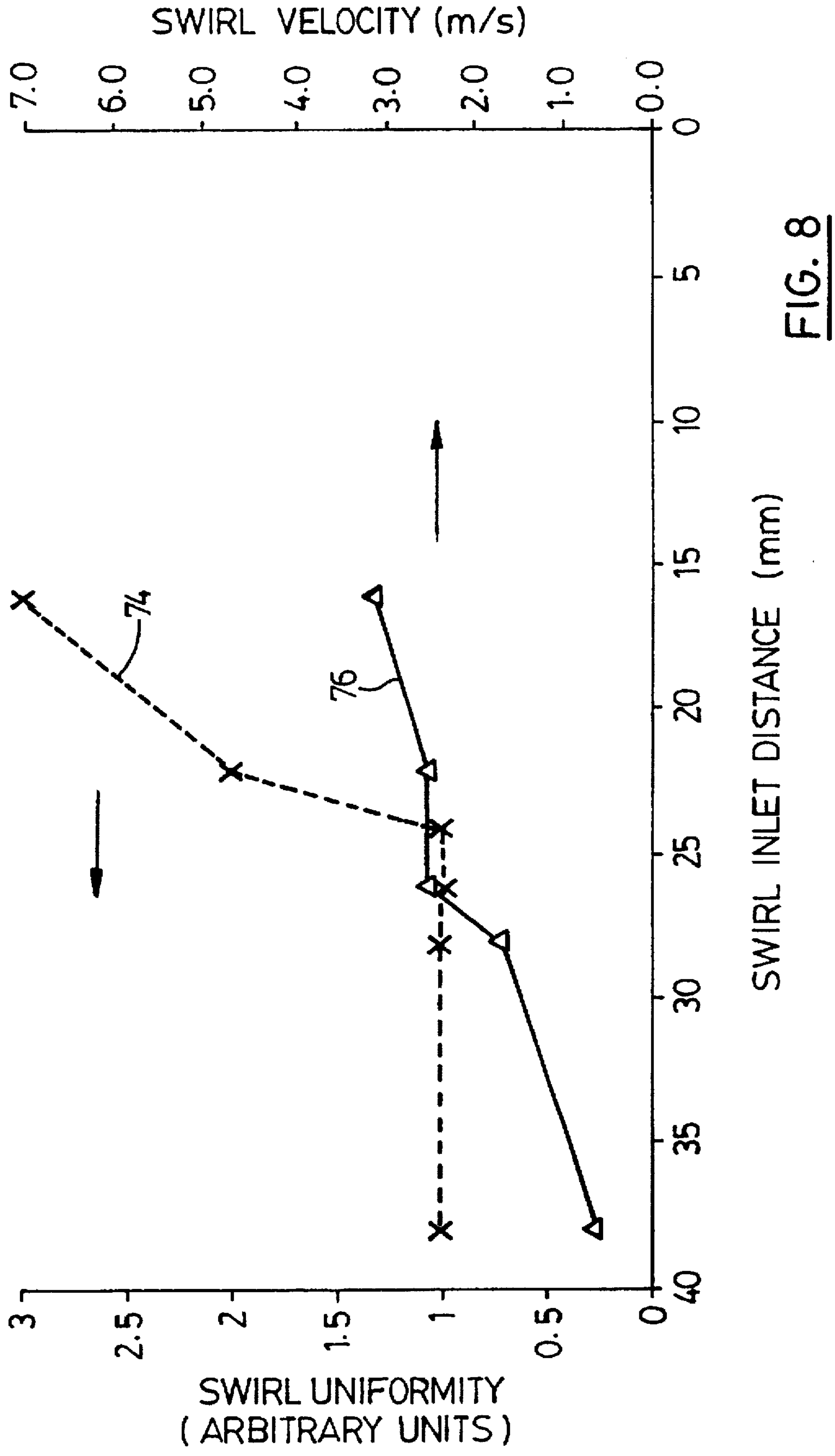
FIG. 8 is a graph showing variation of swirl uniformity and swirl velocity with swirl inlet distance.

Referring now to FIG. 8, this shows curves 74 and 75 indicative of, respectively, swirl uniformity and swirl velocity. Flow rate was again around 8 l/min. Swirl uniformity is a measure of the variation of swirl angle and swirl velocity with circumferential position. As curve 74 shows, there is a dramatic decrease in swirl uniformity below about 24 mm. A value of 1 indicates complete swirl uniformity, and greater values indicate non-uniform swirl. In effect, as the inlet distance is decreased, the swirl becomes less uniform. This is believed to be because the helical flow contains high velocity threads or jets separated by lower velocity flows. The measurement is qualitative and was obtained from Flow Uniformity Visualization and use of a hot wire. The swirl velocity is an average around 360°. The shape and spacings in the swirl lines were used to indicate the uniformity of the swirl.

As line 76 shows, there is an increase in swirl velocity with decreasing swirl inlet distance. Notably, there is a significant increase in swirl velocity at around 26 mm, where the swirl velocity increases from below 2.0 m/sec. to above 2.0 m/sec.

It can be noted that there is a narrow band around 25 mm, here between 24 and 26 mm, where there is good swirl uniformity and a high swirl velocity. The present inventors believe that it is this narrow range of operating conditions that should be chosen to give optimal swirl characteristics. Note that while the range here is 24–26 mm, the exact value will depend upon the characteristics of individual torches. If any dimension of the torch is changed, then it is likely that this dimension will change as well, and also the band of acceptable swirl inlet distances may vary in width.

Figure 9:
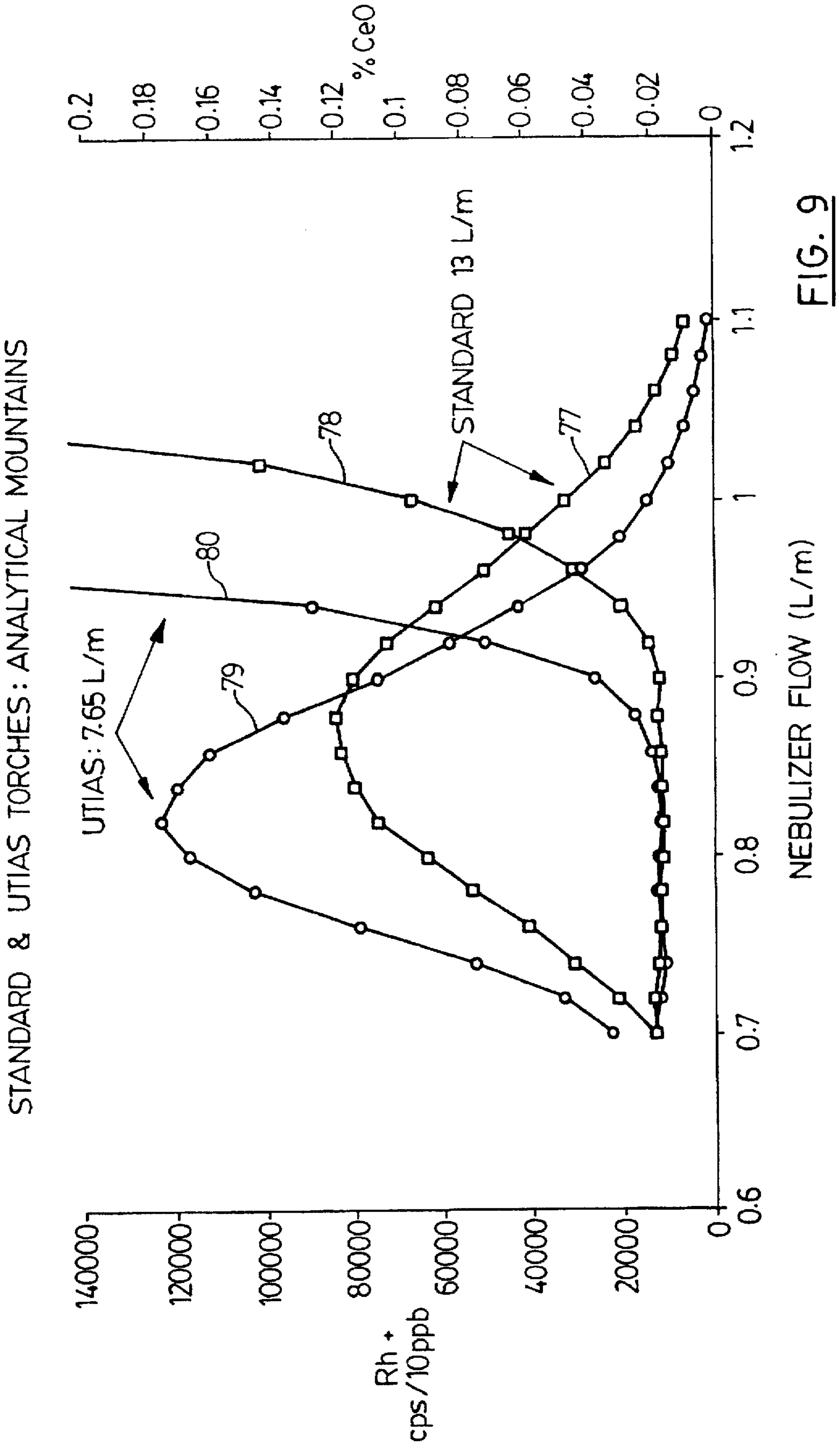
FIG. 9 is a graph showing variation of Rh+ and CeO measurements, for a conventional torch and the torch of the present invention.

Referring now to FIG. 9, this shows so-called analytical mountains, showing variation of counts measured with nebulizer flow. Lines 77 and 78 show Rh+cps, from a 10 ppb sample, and a percentage of CeO measured. These lines 77 and 78 are for a standard torch operating at 13 l/min. Curves 79, 80 are corresponding curves, for a torch of the present invention operating at 7.65 l/min., and again show respectively the Rh+cps and the percentage of CeO.

As noted above, CeO is a measurement of the undesired oxygen, which can interfere with the measurement. These curves show that with suitable adjustment of nebulizer flow, for both torches, one can obtain a peak for Rh+ before the CeO level becomes objectionable. The curves 77, 79 again confirm that the torch of the present invention gives significantly improved performance as compared to a conventional torch. An appropriate adjustment of the nebulizer flow can give a much higher signal.

We claim:

1. A torch for inductively coupled plasma spectrometry, the torch comprising:

an outer tube having a first free end;

an inner tube mounted coaxially within the outer tube, and having a first free end located within the outer tube, a portion of the outer tube extending between the first ends of the inner and outer tubes and defining a chamber for a plasma ball;

an annular channel defined between the inner and outer tubes and opening into the chamber; and a first inlet for a main gas flow opening tangentially into the annular channel, so as to generate a swirl component in the main gas flow through the annular channel;

wherein the axial length of the annular channel between the first inlet and the first end of the inner tube is reduced such as to give a swirl angle, where the annular channel opens into the chamber, sufficient to enable a reduced main gas flow to keep a plasma ball centred and the torch cool, said distance being sufficient to maintain the swirl component of the main gas flow substantially uniform, and wherein the outer tube includes a toroidal bulge, into which the first inlet opens, the toroidal bulge having an internal cross-section at least as large as the internal cross-section of the first inlet, the first inlet being tangential to the toroidal bulge, and the first inlet and the toroidal bulge being aerodynamically smooth.

2. A torch as claimed in claim 1, wherein the swirl angle is at least 35°.

3. A torch as claimed in claim 1, wherein the cross-section of the first inlet, through the first inlet and into the toroidal bulge, is substantially uniform, without any significant throttling of the flow to accelerate the flow.

4. A torch as claimed in claim 3, wherein the internal cross-section of the toroidal bulge is greater than the cross-section of the first inlet.

5. A torch as claimed in claim 4, wherein the toroidal bulge includes an aerodynamically smooth taper into the annular channel, to enhance the swirl component.

6. A torch as claimed in claim 5, wherein the annular channel has an outer diameter of approximately 18 mm and a radial extent of approximately 1 mm, wherein the toroidal bulge has a maximum radial extent of 3.5 mm and an axial length in the range of 25–26 mm approximately, and wherein the first inlet has an internal diameter of approximately 6 mm, and wherein the toroidal bulge, in section, includes a circular portion having an internal radius of approximately 6 mm.

7. A torch as claimed in claim 6, wherein the first inlet is tangential to a circle located, axially equidistant from ends of the toroidal bulge, and having a radius approximately 1.6 mm greater than the radius of the outside of the inner tube.

8. A torch as claimed in claim 1, 2 or 7, wherein the axial length of the annular channel between the first inlet and the first end of the inner tube is in the range 24–26 mm.

9. A torch as claimed in claim 5, which includes a second inlet connected to the inner tube, for an auxiliary gas flow, the second inlet opening tangentially with respect to the interior of the inner tube.

10. A torch as claimed in claim 9, wherein the outer tube has a second end secured to the inner tube, to close off the annular channel, wherein the inner tube extends beyond the second end of the outer tube and the second inlet is connected to the inner tube outside of the outer tube.

11. A torch for inductively coupled plasma spectrometry, the torch comprising:

an outer tube having a first free end;

an inner tube mounted coaxially within the outer tube, and having a first free end located within the outer tube, a portion of the outer tube extending between the first ends of the inner and outer tubes and defining a chamber for a plasma ball;

an annular channel defined between the inner and outer tubes and opening into the chamber; and a first inlet for a main gas flow opening tangentially into the annular channel, so as to generate a swirl component in the main gas flow through the annular channel;

wherein the outer tube includes a toroidal bulge into which the first inlet opens, the toroidal bulge having an internal cross-section at least as large as the internal cross-section of the first inlet, the first inlet being tangential to the toroidal bulge, and the first inlet and the toroidal bulge being aerodynamically smooth.

12. A torch as claimed in claim 11, wherein the internal cross-section of the toroidal bulge is greater than the cross-section of the first inlet, to ensure that the main gas flow is not accelerated as that gas flow enters the toroidal bulge.

13. A torch as claimed in claim 12, wherein the toroidal bulge includes an aerodynamically smooth taper into the annular channel, to enhance the swirl component.

14. A torch as claimed in claim 13, wherein the annular channel has an outer diameter of approximately 18 mm and a radial extent of approximately 1 mm, wherein the toroidal bulge has a maximum radial extent of 3.6 mm and an axial length in the range of 25–26 mm approximately, and wherein the first inlet has an internal diameter of approximately 6 mm, and wherein the toroidal bulge, in section, includes a circular portion having an internal radius of approximately 6 mm.

15. A torch as claimed in claim 14, wherein the first inlet is tangential to a circle located, axially equidistant from ends of the toroidal bulge, and having a radius approximately 1.6 mm greater than the radius of the outside of the inner tube.

16. A method of generating a plasma ball for inductively coupled plasma spectrometry, the method comprising the following steps:

(1) providing a torch having an outer tube defining a generally cylindrical chamber for a plasma ball, an inner tube, an annular channel defined between the inner and outer tubes which annular channel opens into the chamber, and a first inlet for a main gas flow opening tangentially into the annular channel, the axial length of the annular channel between the first inlet and a free end of the inner tube being reduced such as to give a swirl angle, where the annular channel opens into the chamber, sufficient to enable a reduced main gas flow to keep a plasma ball centred and the torch cool, said distance being sufficient to maintain the swirl component of the main gas flow substantially uniform;

(2) providing a toroidal bulge in the outer tube, with the toroidal bulge having an internal cross-section at least as large as the internal cross-section of the first inlet, providing the first inlet tangential to the toroidal bulge, and providing an aerodynamically smooth surface for the first inlet and the toroidal bulge;

(3) providing a tube for a nebulizer gas flow, generally coaxial with the inner and outer tubes, so as to define a secondary annular channel between the nebulizer tube and the inner tube, the nebulizer tube opening into the chamber;

(4) providing a flow of nebulizer gas including a sample through the nebulizer tube to the chamber, and an auxiliary gas flow through the secondary annular channel to the chamber;

(5) providing a main gas flow through the first inlet to the annular channel, the flow rate of the main gas being selected so as to provide sufficient swirl velocity to the main gas flow in the chamber, to maintain a stable plasma ball and protect the outer tube; and (6) igniting a plasma ball in the chamber, by means of an applied radio frequency field.

17. A method as claimed in claim 16, wherein the flow rate of the main gas flow is selected so as to give a swirl velocity, where the main gas flows from the annular channel into the chamber, in excess of 2 m/sec.

18. A method as claimed in claim 17, wherein the main gas flow has a swirl angle of at least 35°.

19. A method as claimed in claim 16, wherein for a torch with an annular channel having an outer diameter of approximately 18 mm and an inner diameter of approximately 16 mm, the main gas flow is less than or equal to 10 l/min.

20. A method as claimed in claim 19, wherein the main gas flow is less than 8 l/min.

21. A method as claimed in claim 17 or 20, wherein the primary and secondary gas flows consist of argon, and wherein the nebulizer gas flow comprises principally argon and any desired sample.

22. A torch for inductively coupled plasma spectrometry, the torch comprising:

an outer tube having a first free end;

an inner tube mounted coaxially within the outer tube, and having a first free end located within the outer tube, a portion of the outer tube extending between the first ends of the inner and outer tubes and defining a chamber for a plasma ball;

an annular channel defined between the inner and outer tubes and opening into the chamber; and a first inlet for a main gas flow opening tangentially into the annular channel, so as to generate a swirl component in the main gas flow through the annular channel;

wherein the annular channel has a substantially constant cross-section and the axial length of the annular channel between the first inlet and the first end of the inner tube is in the range of approximately 25 to 26 millimeters, such as to give a swirl angle, where the annular channel opens into the chamber, sufficient to enable a reduced main gas flow to keep a plasma ball centred and the torch cool, said distance being sufficient to maintain the swirl component of the main gas flow substantially uniform.

23. A torch as claimed in claim 22, wherein the swirl angle is at least 35°.

24. A torch as claimed in claim 23, wherein the cross-section of the first inlet, through the first inlet and into the annular channel, is substantially uniform, without any significant throttling of the flow to accelerate the flow.

* * * * *